(12) United States Patent
Huang et al.

(10) Patent No.: US 7,050,043 B2
(45) Date of Patent: May 23, 2006

(54) OPTICAL APPARATUS

(75) Inventors: Chien-Chang Huang, Hsinchu (TW);
Chun-Huang Lin, Hsinchu (TW);
Jeng-Feng Lan, Hsinchu (TW)

(73) Assignee: PixArt Imagning Inc., Hsin-Chu (TW)

( * ) Notice: Subject to any disclaimer, the term of this patent is extended or adjusted under 35 U.S.C. 154(b) by 366 days.

(21) Appl. No.: 10/628,438

(22) Filed: Jul. 29, 2003

(65) Prior Publication Data

US 2004/0042232 A1 Mar. 4, 2004

(30) Foreign Application Priority Data

Sep. 2, 2002 (TW) ............... 91119937 A
Nov. 29, 2002 (CN) ............... 02152985.X

(51) Int. Cl.
*G09G 5/08* (2006.01)

(52) U.S. Cl. ...................... 345/166; 345/175

(58) Field of Classification Search ........... 345/163, 345/165, 166, 179, 156, 157, 175
See application file for complete search history.

(56) References Cited

U.S. PATENT DOCUMENTS

| 4,751,505 | A | 6/1988 | Williams et al. |
| 5,349,371 | A | 9/1994 | Fong |
| 6,218,659 | B1 * | 4/2001 | Bidiville et al. ............ 250/221 |
| 2003/0034959 | A1 * | 2/2003 | Davis et al. ................ 345/166 |

* cited by examiner

*Primary Examiner*—Dennis-Doon Chow
(74) *Attorney, Agent, or Firm*—Rabin & Berdo, PC

(57) ABSTRACT

An optical apparatus. The optical apparatus is applied to an object surface, comprising a frame, a light emitting device and an optical sensor. The frame is disposed in the optical apparatus, having a first compartment and a second compartment, wherein the first compartment has a first opening and the second compartment has a second opening. The light emitting device is disposed in the first compartment, wherein light emitted from the light emitting device passes through the first opening and is reflected by the object surface outside the frame. The optical sensor is disposed in the second compartment to receive light reflected from the object surface passing through the second opening.

12 Claims, 3 Drawing Sheets

OPTICAL APPARATUS

BACKGROUND OF THE INVENTION

1. Field of the Invention

The present invention relates to an optical apparatus, and in particular to a compact optical apparatus for use on an object surface with limited area, that offers high accuracy and low assembly cost.

2. Description of the Related Art

Applications relative to optical interface technology, such as optical pointing devices, have become increasingly popular. For example, conventional and optical pointing devices and optical pens are successful applications of apparatuses employing optical sensor technology. As the demand increases for functions, mobility and small size of the optical apparatuses, it becomes a challenge to product such apparatuses with impact size, high accuracy, simple assembling processes and low cost of assembling.

With respect to the conventional optical pointing devices and optical pens, mobility increases with reduced size such that they are more convenient, particularly for use with mobile computers. Moreover, as the conventional optical apparatus generally includes a plurality of internally disposed optical components (lenses, sensor and optical guiding mechanisms), various types of packaging technology can be applied thereto. Generally, the optical components are assembled before being packaged inside the product. As the number of functions and components increase, however, the optical apparatus package inevitably trends toward integration and modulization to save space.

FIG. 1 is a sectional view of a conventional optical pen. As shown in FIG. 1, a conventional optical pen 1 is applied to an object surface 2. The displacement relative to the object surface 2 can be sensed by an optical sensor 6 receiving light reflected by the object surface 2. As shown in FIG. 1, the optical pen 1 has a light emitting diode (LED) 3 emitting light which passes through a light guiding mechanism 4. The light guiding mechanism 4 comprises a first light guiding element 41 and a second light guiding element 42. The arrow in FIG. 1 shows the path of light emitted from the light emitting diode (LED) 3 as it passes through the first and second light guiding elements 41 and 42 sequentially, and is projected on the object surface 2 under a lens 5 such that the reflected light is easily received by the optical sensor 6. Particularly, the sensor 6 is disposed above the lens 5 and is capable of efficiently guiding the reflected light to the sensor 6.

With respect to the conventional mechanism of an optical apparatus as mentioned above, however, the light emitting diode (LED) 3, the light guiding mechanism 4 and the lens 5 are independently installed in the optical pen 1 and occupy a large space due to the components' size. Additionally it is difficult to install the components in the small space provided by the package with a high degree of accuracy and sensitivity.

To address the above mentioned disadvantages, another conventional optical pointing device is shown in FIG. 2. The optical pointing device comprises a frame 11. The frame is a traditional lead-frame type IC package structure, wherein the frame 11 has a plurality of pins 14 connected to an external circuit or a computer. As shown in FIG. 2, an optical sensor chip 12 is fixed in a hollow space 11' in the frame 11 such that electrical signal can be delivered by the conducting wires 12' connected to the pins 14.

Furthermore, a light emitting diode (LED) 7 emits light which passes through a light guiding element 8 and is then reflected by an object surface 9 such that the sensor chip 12 receives the reflected light passing through a light guiding lens 10. The reduced size of the sensor and other components such as the light guiding element 8 and the light guiding lens 10 inside the optical pointing device are integrally mounted on the same structure as shown in FIG. 2, the overall size of the optical pointing device can be greatly reduced.

To improve the conventional optical mechanism of the optical apparatus as mentioned above, the present invention provides an impact optical apparatus with smaller size.

SUMMARY OF THE INVENTION

An object of the invention is to provide an impact optical apparatus with small size, high accuracy and low cost of assembling.

The optical apparatus of the present invention is applied to an object surface, comprising a frame, a light emitting device and an optical sensor. The frame is disposed in the optical apparatus, having a first compartment and a second compartment, wherein the first compartment has a first opening and the second compartment has a second opening. The light emitting device is disposed in the first compartment, wherein light emitted from the light emitting device passes through the first opening and is reflected by the object surface outside the frame. The optical sensor is disposed in the second compartment to receive light reflected from the object surface passing through the second opening.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
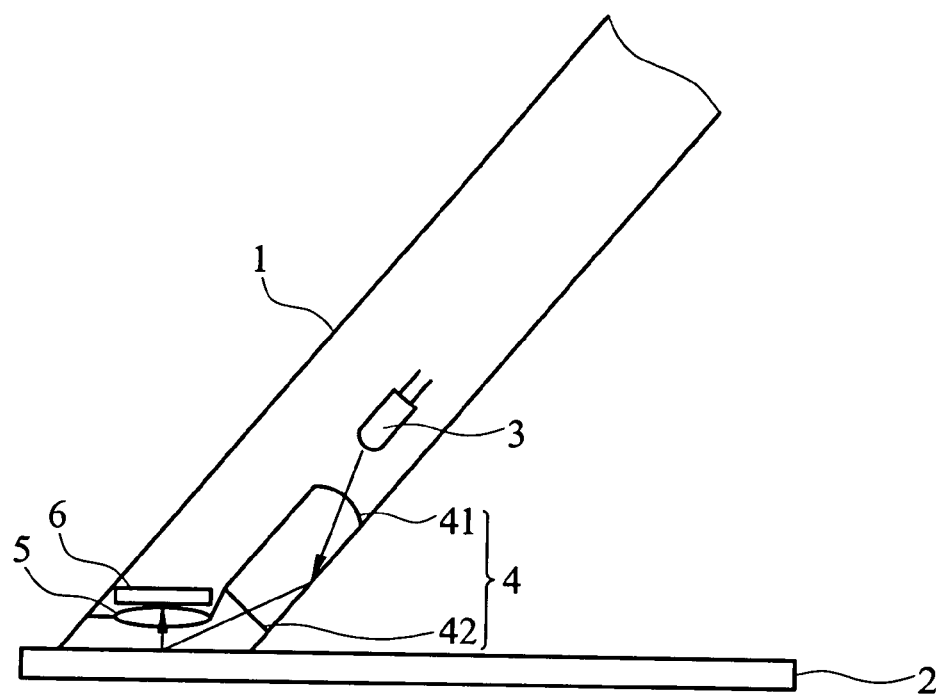
FIG. 1 is a sectional view of a conventional optical pen.
Figure 2:
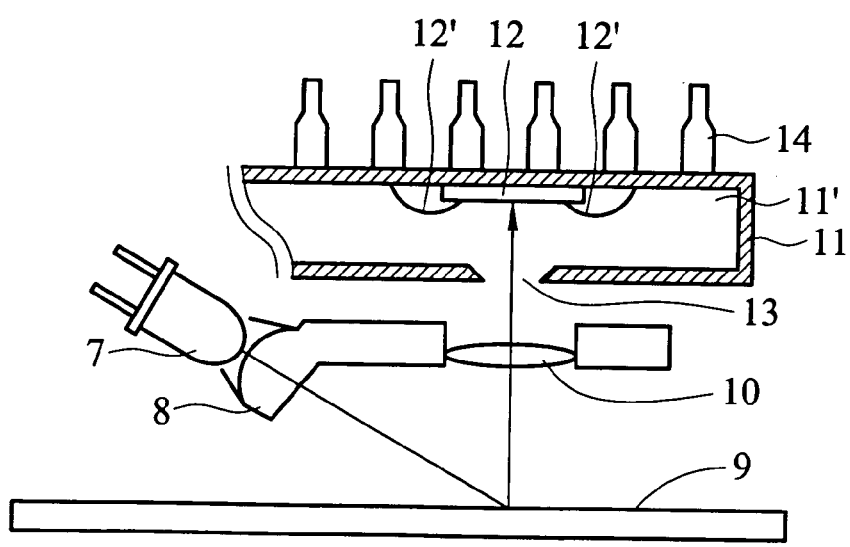
FIG. 2 is a sectional view of a conventional optical pointing device.
Figure 3:
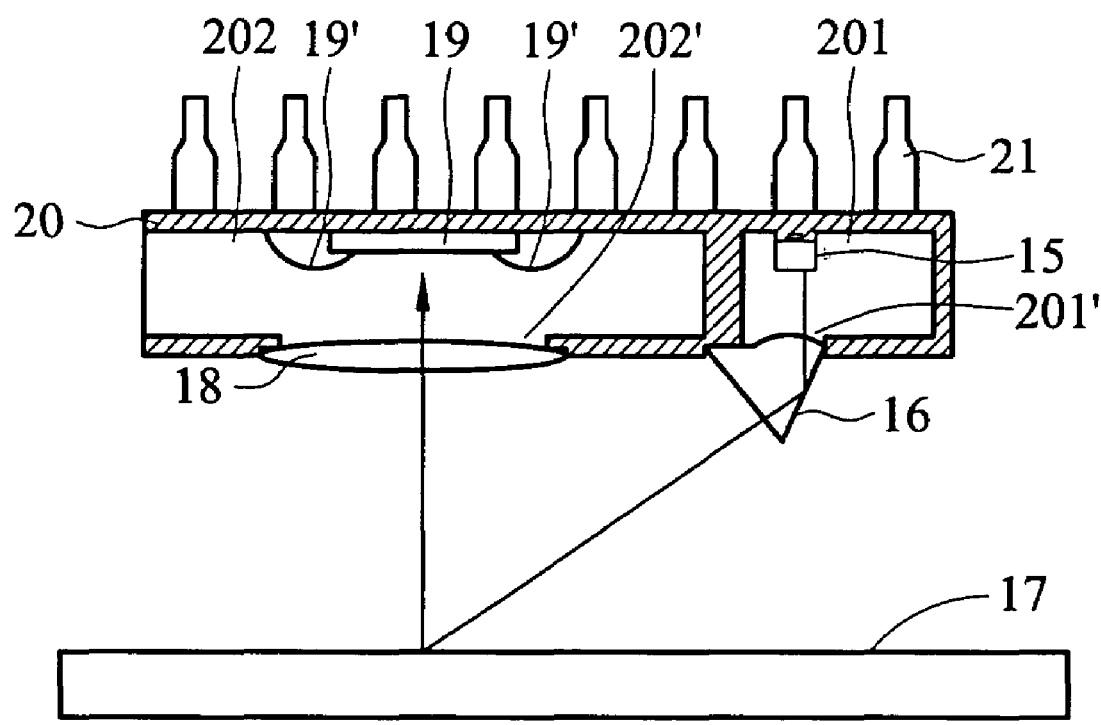
FIG. 3 is a sectional view of the first embodiment in accordance with the present invention.

FIG. 3 is a sectional view of the first embodiment in accordance with the present invention. As shown in FIG. 3, the optical apparatus for an object surface 17 is provided with a light emitting diode (LED) 15, a light guiding element 16, a lens 18, a sensor chip 19 and a frame 20. Particularly, the frame 20 is the traditional lead-frame type IC package structure comprising a first compartment 201 and a second compartment 202, wherein the first compartment 201 has an opening 201' and the second compartment 202 has an opening 202'. The light emitting diode (LED) 15 is a bare LED chip mounted in the first compartment 201 by Surface Mount Technology (SMT). In FIG. 3, the light guiding element 16 is disposed in the opening 201' and the lens 18 is disposed the opening 202', wherein the sensor chip 19 is mounted in the second compartment 202.

Figure 4:
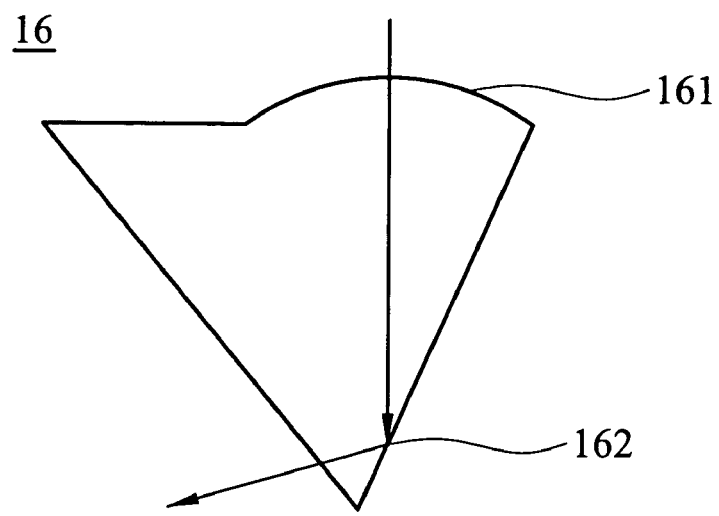
FIG. 4 illustrates the light guiding element in accordance with the present invention.

As the arrow shows in FIG. 3, light emitted from the light emitting diode (LED) 15 passes through the light guiding element 16 and projects on the object surface 17 under the lens 18. Referring to FIG. 4, the light guiding element 16 can guide and reflect light in a specific direction, wherein the arrow indicates the direction of light. The light guiding element 16 comprises a convex 161 and a reflecting surface 162 such that light emitted from the light emitting diode (LED) 15 enters the convex 161 then reflects via the reflecting surface 162, wherein the convex 161 is capable of gathering and guiding light to the reflecting surface 162 without light dissipation. Thus, light can pass through the convex 161 and reflect via the reflecting surface 162 in a specific direction.

As mentioned above, light exits the light guiding element 16 in a specific departure direction to project on the object surface 17 beneath the lens 18. Therefore, the light guiding element 16 guides light such that the sensor chip 19 can efficiently receive the reflected light from the object surface 17 beneath the lens 18. The light signal received by the sensor 19 is then transformed into an electrical signal passing through the conducting wires 19' and pins 21 to an external circuit or a computer.

As the present invention integrates the optical components in a single frame according to this embodiment, the size of the optical mechanism has been obviously reduced. Moreover, the optical apparatus of the present invention is highly sensitive and accurate due to the tight mounting of components in a single compact frame. Therefore, a compact optical apparatus such as an optical pointing device is provided with small size, high accuracy and low cost according to the present invention.

Second Embodiment

Figure 5:
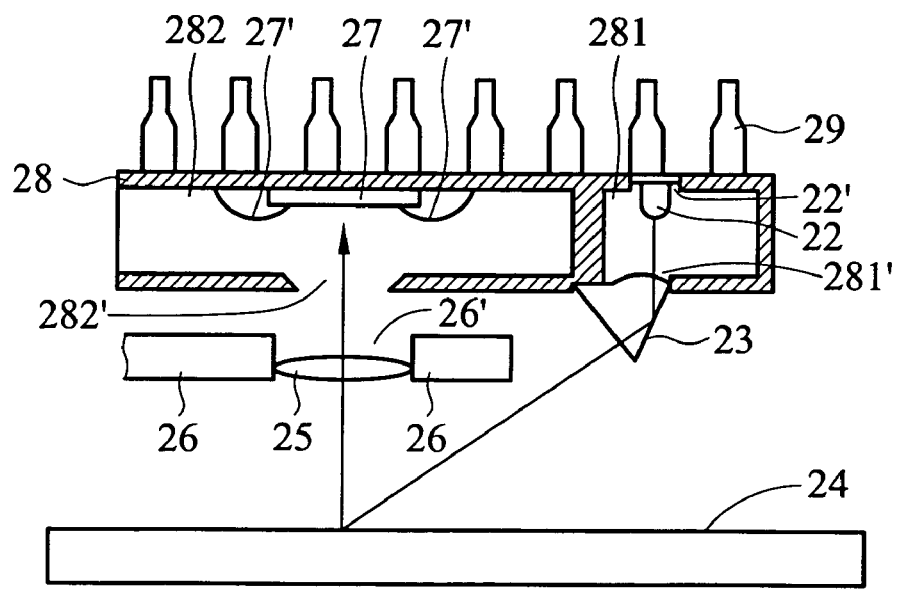
FIG. 5 is a sectional view of the second embodiment in accordance with the present invention.

FIG. 5 is a sectional view of the second embodiment in accordance with the present invention. As shown in FIG. 5, the optical apparatus for an object surface 24 is provided with a light emitting diode (LED) 22, a light guiding element 23, a lens 25, a fixing mechanism 26, a sensor chip 27 and a frame 28. Particularly, the frame 28 is the traditional lead-frame type IC package structure comprising a first compartment 281 and a second compartment 282, wherein the first compartment 281 has openings 22' and 281' while the second compartment 282 has an opening 282'.

A sensor chip 27 is mounted in the second compartment 282 such that the light signal received by the sensor chip 27 is transformed into electrical signal passing through the conducting wires 27' and the pins 29. The sensor chip 27 can electrically communicate with an external circuit or a computer through the conducting wires 27' and the pins 29.

In this embodiment, the light emitting diode (LED) 22 is a packaged component disposed in the opening 22' of the first compartment 281. Particularly, a fixing mechanism 26 is provided in this embodiment such that the lens 25 is mounted in the opening 26' thereof when an adequate focus distance from the lens 25 to the sensor chip 27 is required. Thus, light emitted from the light emitting diode (LED) 22 passes through the light guiding element 23 then projects on the object surface 24 beneath the lens 25 such that the sensor chip 27 can efficiently receive the reflected light from the object surface 24.

Particularly, the present invention can selectively utilize a LED component mounted in the opening 22' or on the inner surface of the first compartment 281 by Surface Mount Technology (SMT). Moreover, with respect to different focus distance requirements of the lens 25 can be fixed in the opening 26' of the fixing mechanism 26 to keep an appropriate focus distance from the lens to the sensor chip 27.

In summary, the present invention achieves compact size by integrating the optical components in a single frame such that it can be widely applied to mobile electronic products such as optical pointing device. Moreover, the assembling processes is simplified and manufacturing cost is reduced by integrating the components in a single frame structure. Furthermore, the sensitivity, accuracy and the strength can also increase due to the compact frame integrated with the optical components according to the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical apparatus for use on an object surface, comprising:
   a IC package structure, having a first compartment and a second compartment, wherein the first compartment has a first opening and the second compartment has a second opening;
   a light emitting device bonded in the first compartment, wherein light emitted from the light emitting device passes through the first opening and is reflected by the object; and
   an optical sensor bonded in the second compartment, and receiving the light reflected through the second opening from the object surface.

2. The optical apparatus as claimed in claim 1, further comprising a light guiding element disposed in the first opening to guide the light in a specific direction.

3. The optical apparatus as claimed in claim 1, further comprising a lens disposed in the second opening for guiding the light to the optical sensor.

4. The optical apparatus as claimed in claim 1, further comprising a lens and a fixing mechanism, wherein fixing mechanism has a third opening in which the lens is disposed.

5. The optical apparatus as claimed in claim 1, wherein the light emitting device bonded in the first compartment is a surface mounted light emitting diode (LED).

6. The optical apparatus as claimed in claim 1, wherein the optical apparatus is an optical pointing device.

7. An optical apparatus for use of an object surface, comprising:
   a IC package structure, having a first compartment and a second compartment, wherein the first compartment has a first and a third opening and the second compartment has a second opening;
   a light emitting device bonded in the third opening, wherein light emitted from the light emitting device passes through the first opening and is reflected by the object surface; and
   an optical sensor in the second compartment, and receiving the light reflected through the second opening from the object surface.

8. The optical apparatus as claimed in claim 7, further comprising a light guiding element disposed in the first opening to guide the light in a specific direction.

9. The optical apparatus as claimed in claim 7, further comprising a lens disposed in the second opening guiding the light to the optical sensor.

10. The optical apparatus as claimed in claim 7, further comprising a lens and a fixing mechanism, wherein the fixing mechanism has a fourth opening in which the lens is disposed.

11. The optical apparatus as claimed in claim 7, wherein the light emitting device bonded in the third opening is a packaged light emitting diode (LED).

12. The optical apparatus as claimed in claim 7, wherein the optical apparatus is an optical pointing device.

* * * * *

(12) EX PARTE REEXAMINATION CERTIFICATE (8445th)
United States Patent
Huang et al.

(10) Number: US 7,050,043 C1
(45) Certificate Issued: Aug. 2, 2011

(54) OPTICAL APPARATUS

(75) Inventors: Chien-Chang Huang, Hsinchu (TW); Chun-Huang Lin, Hsinchu (TW); Jeng-Feng Lan, Hsinchu (TW)

(73) Assignee: PixArt Imaging, Inc., Hsin-Chu (TW)

Reexamination Request:
No. 90/011,093, Jul. 14, 2010

Reexamination Certificate for:
Patent No.: 7,050,043
Issued: May 23, 2006
Appl. No.: 10/628,438
Filed: Jul. 29, 2003

(51) Int. Cl.
*G09G 5/08* (2006.01)

(52) U.S. Cl. .......................... 345/166; 345/175
(58) Field of Classification Search .............. 345/166

See application file for complete search history.

(56) References Cited

U.S. PATENT DOCUMENTS

| 7,050,043 | B2 | 5/2006 | Huang et al. |
| 2003/0142075 | A1 | 7/2003 | Chin |
| 2004/0000698 | A1 | 1/2004 | Chen |

FOREIGN PATENT DOCUMENTS

| JP | 10267647 | 10/1998 |
| JP | 2000322989 | 11/2000 |

*Primary Examiner* — Deandra M. Hughes

(57) ABSTRACT

An optical apparatus. The optical apparatus is applied to an object surface, comprising a frame, a light emitting device and an optical sensor. The frame is disposed in the optical apparatus, having a first compartment and a second compartment, wherein the first compartment has a first opening and the second compartment has a second opening. The light emitting device is disposed in the first compartment, wherein light emitted from the light emitting device passes through the first opening and is reflected by the object surface outside the frame. The optical sensor is disposed in the second compartment to receive light reflected from the object surface passing through the second opening.

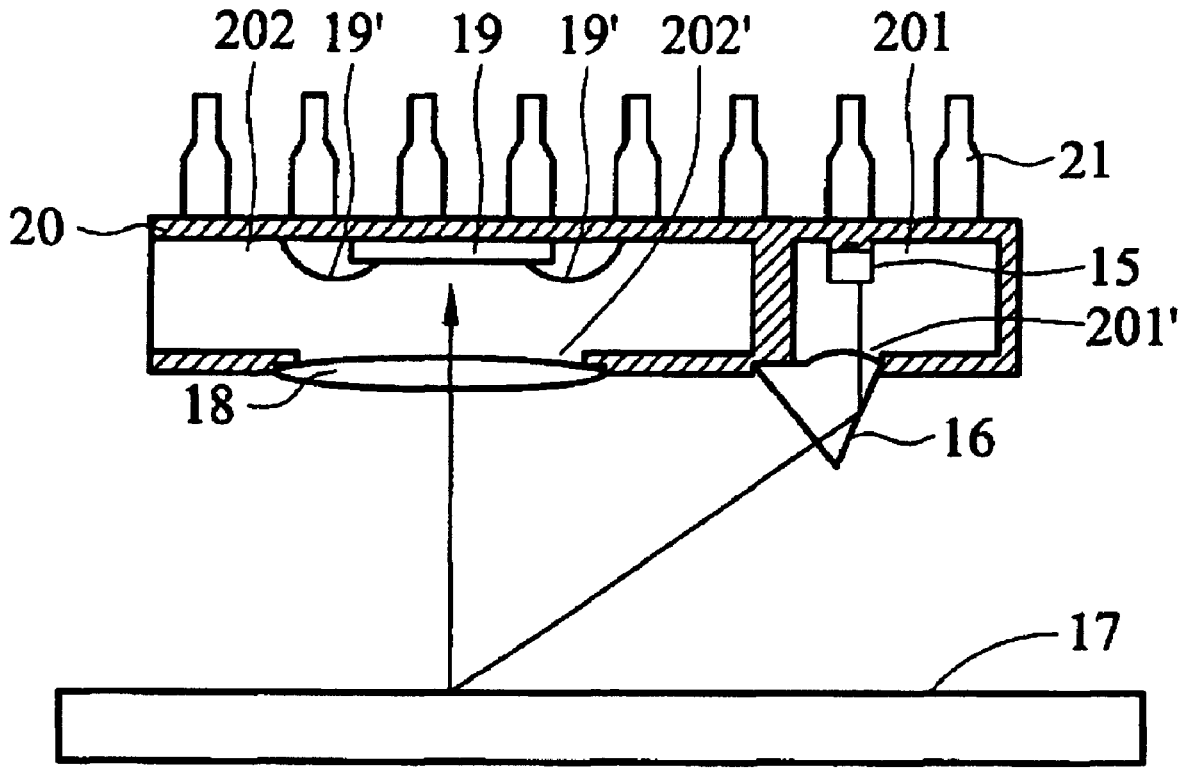

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended.

Claims 2-6 and 8-12, dependent on an amended claim, are determined to be patentable.

1. An optical apparatus for use on an object surface, comprising:

*an* IC package structure, having a first compartment and a second compartment, wherein the first compartment has a first opening and the second compartment has a second opening, *and wherein at least one of said first opening and said second opening is a partial opening partially uncovering said corresponding first compartment or second compartment at a side thereof;* a light emitting device bonded in the first compartment, wherein light emitted from the light emitting device passes through the first opening and is reflected by the object *surface*; and an optical sensor bonded in the second compartment, and receiving the light reflected through the second opening from the object surface.

7. An optical apparatus for use of an object surface, comprising:

*an* IC package structure, having a first compartment and a second compartment, wherein the first compartment has a first and a third opening and the second compartment has a second opening, *and wherein at least one of said first opening and said second opening is a partial opening partially uncovering said corresponding first compartment or second compartment at a side thereof;* a light emitting device bonded in the third opening, wherein light emitted from the light emitting device passes through the first opening and is reflected by the object surface;

and an optical sensor in the second compartment, and receiving the light reflected through the second opening from the object surface.

* * * * *